United States Patent
O'Brien (10) Patent No.: US 11,438,399 B1
(45) Date of Patent: Sep. 6, 2022

(54) FAST LOADING AND DISPLAY OF IMAGE PREVIEWS

(71) Applicant: Twitter, Inc., San Francisco, CA (US)

(72) Inventor: Nolan Daniel O'Brien, Henderson, NV (US)

(73) Assignee: Twitter, Inc., San Francisco, CA (US)

( * ) Notice: Subject to any disclaimer, the term of this patent is extended or adjusted under 35 U.S.C. 154(b) by 177 days.

(21) Appl. No.: 16/872,263

(22) Filed: May 11, 2020

Related U.S. Application Data (63) Continuation of application No. 15/947,698, filed on Apr. 6, 2018, now Pat. No. 10,652,302.

(51) Int. Cl.
| | |
|---|---|
| *H04L 65/70* | (2022.01) |
| *G06T 3/40* | (2006.01) |
| *G06F 16/95* | (2019.01) |
| *H04L 51/10* | (2022.01) |
| *H04L 51/52* | (2022.01) |

(52) U.S. Cl.
CPC .............. *H04L 65/70* (2022.05); *G06F 16/95* (2019.01); *G06T 3/40* (2013.01); *H04L 51/10* (2013.01); *H04L 51/52* (2022.05)

(58) Field of Classification Search
CPC ....... H04L 65/607; H04L 51/10; H04L 51/32; G06F 16/95; G06T 3/40
See application file for complete search history.

(56) References Cited

U.S. PATENT DOCUMENTS

| | | | | |
|---|---|---|---|---|
| 2012/0294352 A1* | 11/2012 | Koum | ...................... | H04W 4/20 375/240.01 |
| 2015/0212655 A1* | 7/2015 | Koski | ...................... | G06F 16/50 715/730 |
| 2018/0192059 A1* | 7/2018 | Yang | ...................... | G01S 17/931 |

* cited by examiner

*Primary Examiner* — Jianxun Yang
(74) *Attorney, Agent, or Firm* — Fish & Richardson P.C.

(57) ABSTRACT

Methods, systems, and apparatus, including computer programs encoded on computer storage media, for providing images in the form of tiny previews in messages of a message stream sent to user devices in an online social messaging platform.

24 Claims, 3 Drawing Sheets

FAST LOADING AND DISPLAY OF IMAGE PREVIEWS

CROSS-REFERENCE TO RELATED APPLICATIONS

This application is a continuation of, and claims priority to, U.S. patent application Ser. No. 15/947,698, for FAST LOADING AND DISPLAY OF IMAGE PREVIEWS, filed on Apr. 6, 2018. The disclosure of the foregoing application is incorporated here by reference.

BACKGROUND

This specification relates to social messaging platforms, and in particular, to platforms that include images in message streams.

Social messaging platforms and network-connected personal computing devices allow users to create and share content across multiple devices in real-time.

Sophisticated mobile computing devices such as smartphones and tablets make it easy and convenient for people, companies, and other entities to use social networking messaging platforms and applications. Popular social messaging platforms generally provide functionality for users to draft and send messages, both synchronously and asynchronously, to other users. Such messages may include images. Other common features include the ability to post messages that are visible to one or more identified other users of the platform, or even publicly to any user of the platform without specific designation by the authoring user. Examples of popular social messaging platforms include Facebook, Pinterest, and Twitter. ("Facebook" is a trademark of Facebook, Inc. "Pinterest" is a trademark of Pinterest, Inc. "Twitter" is a trademark of Twitter, Inc.)

SUMMARY

This specification describes technologies for providing images in messages of a message stream sent to user devices in an online social messaging platform. These technologies generally involve determining for particular circumstances that such images in the messages should be provided as what will be referred to in this specification as tiny previews, converting images in such messages to tiny previews, and sending the messages, generally in a stream of messages, to user devices to which the circumstances apply.

The subject matter described in this specification as implemented in particular embodiments realizes one or more of the following technical advantages. The use of tiny previews offers a useable sense of the information content of the image, without the cost of transmitting the image to the user device. This is particularly advantageous in circumstances where the data transmission capacity to the user device is limited. Tiny preview images will on average have about 500 or about 1,000 bytes of data. A tiny preview having dimensions having on the order of 64×64 pixels can be scaled up to an image having on the order of 512×512 pixels with smoothing on the user device to provide a good user experience. Compared to conventional preview images, which generally have a size on the order of 75,000 bytes, using tiny preview images represents a reduction of almost 98% in the amount of transmitted for the preview.

Another advantage of using tiny images is that they generally require fewer round trips over the network. Because of its size, a tiny preview, including headers, will generally fit into a single MTU (maximum transmission unit) in the average use case, even if the network bandwidth to the user device is not high.

BRIEF DESCRIPTION

DETAILED DESCRIPTION

Figure 1:
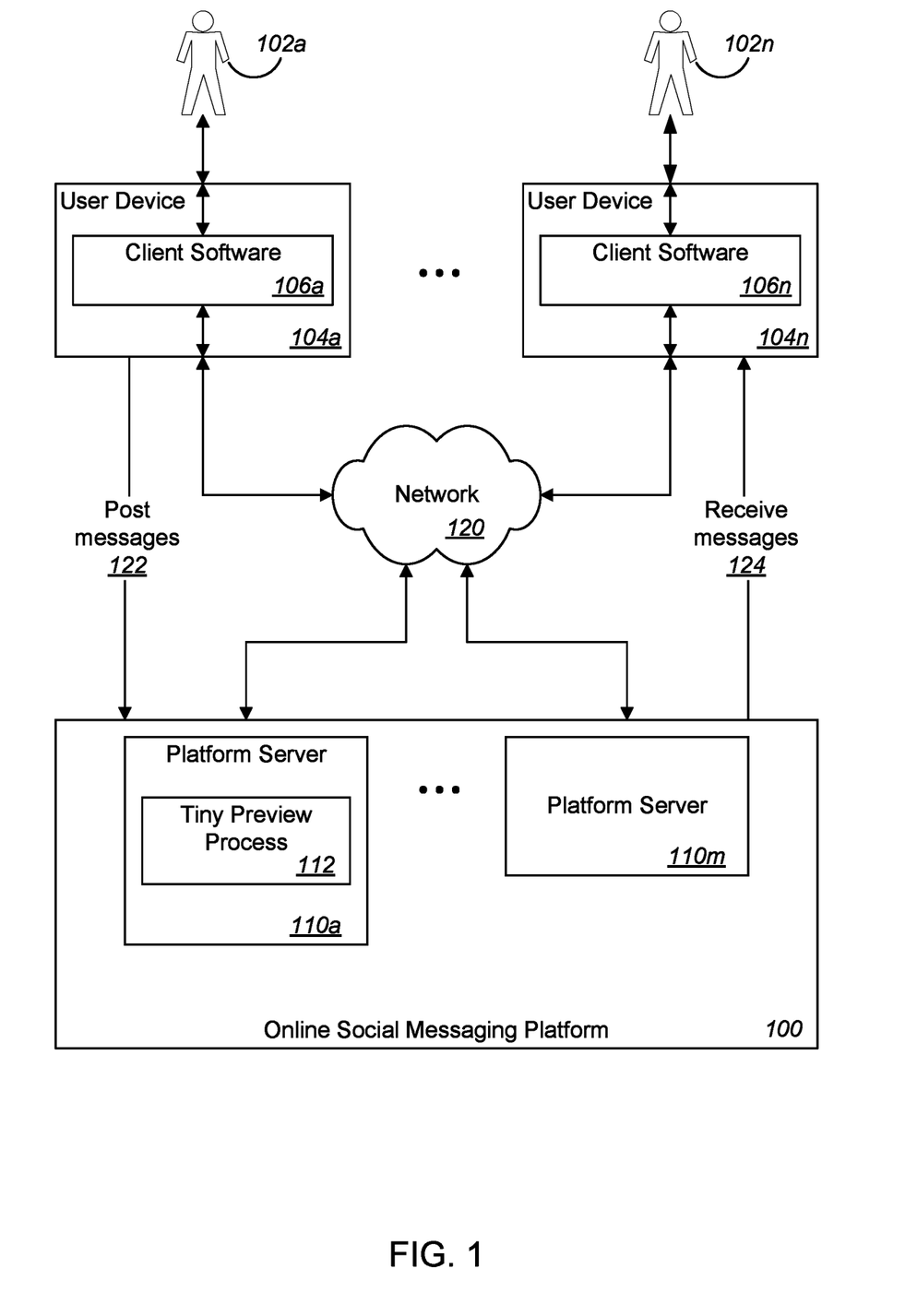
FIG. 1 illustrates an example online social messaging platform.

FIG. 1 illustrates an example online social messaging platform 100 and example user devices 104a-104n configured to interact with the platform over one or more data communication networks 120. The platform, the user devices, or both are configured, as will be described, to implement or perform one or more of the innovative technologies described in this specification.

The platform is implemented on one or more servers 110a-110m. Each server is implemented on one or more computers, e.g., on a cluster of computers. One or more of the servers implement the elements of a tiny-preview process, which will be described later.

Users

Users 102a-102n of the platform use user devices 104a-104n, on which client software 106a-106n is installed, to use the platform. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

In some implementations, the platform allows use of the platform by users who are not account holders or who are not logged in to an account of the platform. If the platform allows use by such users, the platform may allow such a user to post messages or to use other functionality of the platform by associating the user with a temporary account or identifier.

User Devices

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 106a-106n, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app on a mobile device or an installed application on a personal computer, that is designed to work specifically with the platform. Or the client may be or include a Short Messaging Service (SMS) interface, an instant messaging interface, an e-mail-based interface, or an API function-based interface, for example.

Platform

The social messaging platform 100 is implemented on one or more computers in one or more locations that operate as one or more servers that support connections over wired or wireless networks 120 from many different kinds of user devices. The platform may have many millions of accounts, and anywhere from hundreds of thousands to millions of connections may be established or in use between clients and the platform at any given moment.

The platform facilitates real-time communication. The platform and client software are configured to enable users to use the platform to post messages 122 to the platform and to use the platform to receive messages 124 posted by other users.

The platform is configured to provide content, generally messages, to a user in a home feed message stream. The messages will generally be messages from accounts the user is following, and optionally content that such accounts have engaged with, e.g., endorsed. Optionally, the platform is configured to include in a recipient user's home feed stream messages that the platform determines are likely to be of interest to the recipient, e.g., messages on topics of particular current interest, as represented by the number of messages posted on the topics platform users, or messages posted on the topics of apparent interest to the recipient, as represented by messages the recipient has posted or engaged with, as well as selected advertisements, public service announcements, promoted content, or the like.

Messages

The types of data that may be stored in a message include text, graphics, images, video, and computer code, e.g., uniform resource locators (URLs), for example. Messages can also include key phrases, e.g., hashtags, that can aid in categorizing messages or relating messages to topics. Messages can also include metadata, for example, a time and date of authorship and a geographical location of the user device when it submitted the message. In some implementations, what metadata is provided to the platform by a client is determined by privacy settings controlled by the user or the account holder.

In some implementations, messages are microblog posts, which differ from e-mail messages, for example, in that an author of a microblog post does not necessarily need to specify, or even know, who the recipients of the message will be.

Streams

A stream is a stream of messages on the platform that meet one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

Image Preview Processing

Figure 2:
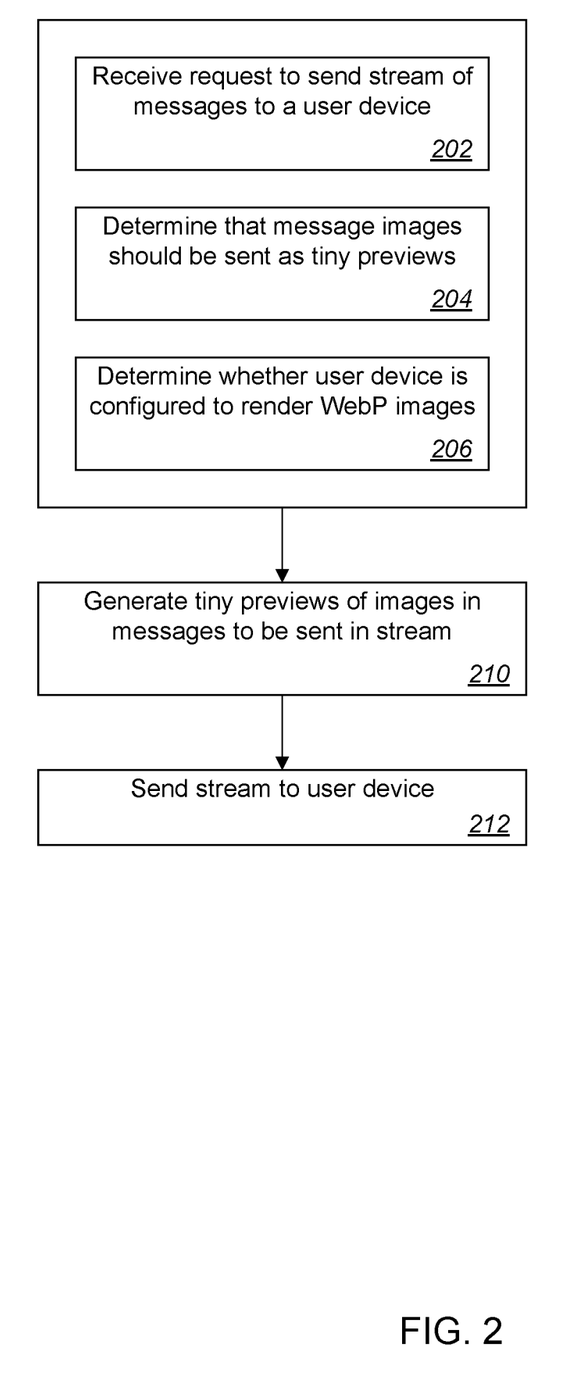
FIG. 2 illustrates elements of image preview processing in the platform.

FIG. 2 illustrates elements of image preview processing in the platform.

The platform receives a request to send a stream of messages to a user device (202). The stream may be, for example, a home feed.

The platform determines that images in the messages in the stream should be sent as tiny previews (204). The platform makes this determination if it receives data from the client on the user device that requests that images be sent as tiny previews. Such a request can be generated and sent to the platform (i) if the user has requested, by input to the client, that images be sent as tiny previews, or (ii) if the client on the user device has determined that images should be sent as tiny previews, or (iii) if the platform determines, based on information available to the platform, that images in messages in streams should be sent as tiny previews.

The platform determines, from data provided by the client or the user device, whether the user device is configured to render images in the WebP image format (206).

As indicated in the figure, these three operations (202, 204, 206) may be performed in any order.

The platform generates tiny previews of the images in the messages in the stream (210). Processes for generating tiny previews will be described below in reference to FIG. 3.

In the absence of a determination that images should be sent as tiny previews, the platform will send the images as standard compressed previews, e.g., rescaled versions of the full-sized image, or in any other default form.

The platform sends the requested stream to the client on the user device for display to the user (212).

Client-Side Determination to Request Tiny Previews

In addition to responding to express user input, some implementations of client software include instructions that can determine that stream images should be sent as tiny previews.

In some implementations, the client determines a current download bit rate, and an amount of data currently remaining in a data plan of the user device, if that data is available. If both the download bit rate and the amount of data remaining are above respective predetermined thresholds, the client does not request tiny previews. If the download bit rate is above the respective predetermined threshold but the amount of data remaining in the data plan is not, then the client requests tiny previews only if the user device is connected to the Internet through a mobile carrier network and not a Wi-Fi network. If neither the download bit rate nor the amount of data remaining are above their respective predetermined thresholds, the client requests tiny previews. For this purpose, the client uses a current download bit rate specific to the client, if that data is available; otherwise, it uses a current download bit rate for the user device, if that data is available; and otherwise, it uses a recent or historical download bit rate for the client or the user device, depending on what data is available.

If information about the amount of data currently remaining in a data plan of the user device is not available, then the client does not request tiny previews if the download bit rate is above the predetermined threshold.

Server-Side Determination to Send Tiny Previews

Independently of any request from the client, the platform can optionally determine that tiny previews should be sent to the user device.

In some implementations, the platform accepts and gives effect to administrator input that specifies that particular kinds of devices, or devices in particular geographic locations, should be treated as having requested tiny previews. In some implementations, the platform can also identify, for that purpose, particular devices, particular kinds of devices, or particular geographic locations of devices, on the basis of data indicating poor download bit rates for the devices, kinds of devices, or locations.

Generating Tiny Previews

Figure 3:
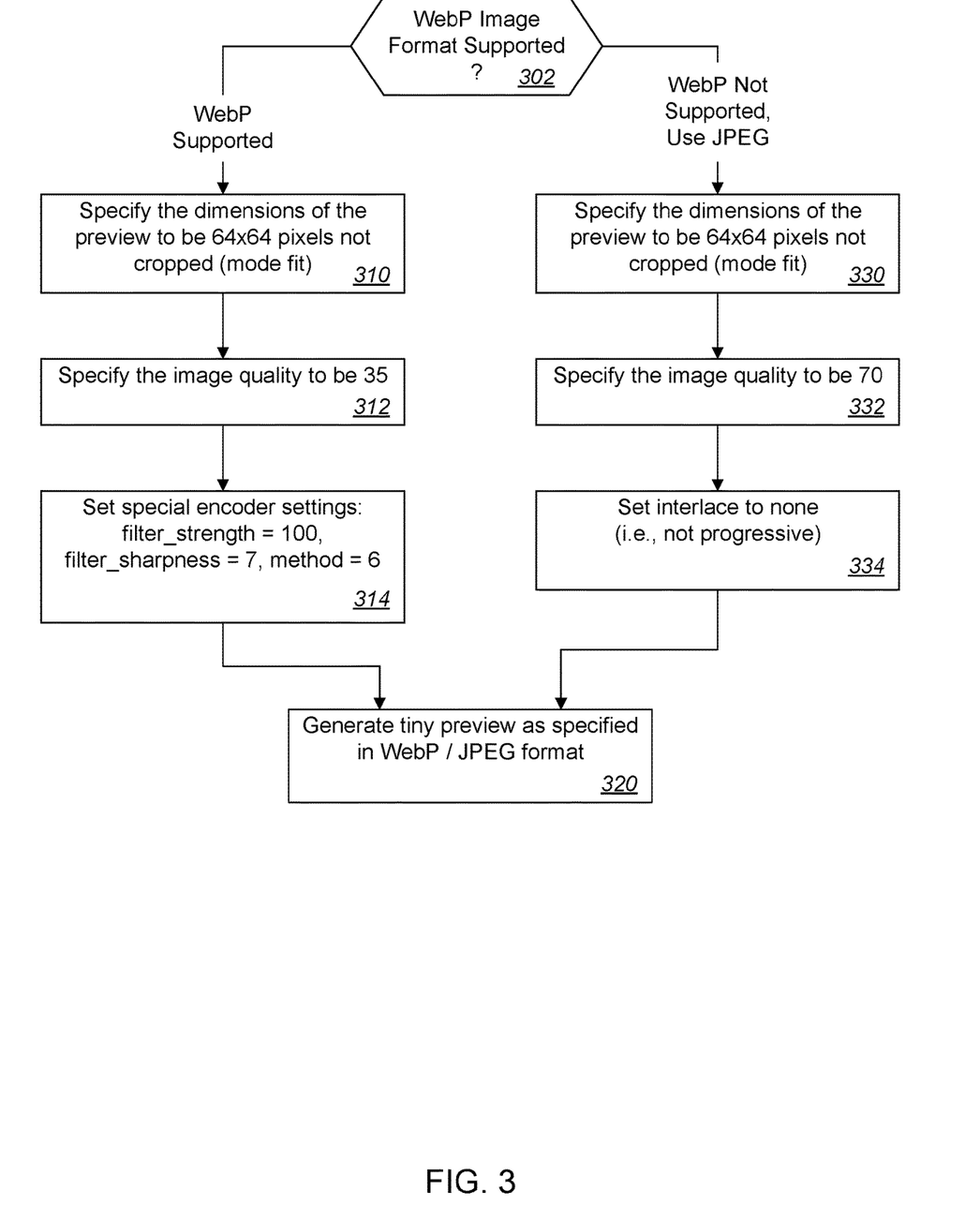
FIG. 3 illustrates preferred methods of generating tiny previews.

FIG. 3 illustrates preferred methods of generating tiny previews.

If the WebP image format is supported on the user device (302 to 310), i.e., the user device is configured with a WebP decoder, the tiny preview is generated as a WebP image. Otherwise, it is generated as a JPEG image (302 to 330), because JPEG decoders are universally available.

The platform specifies the dimensions of the tiny preview to be 64×64 pixels, not cropped, with the aspect preservation mode fit (310, 330).

For WebP, the platform specifies the image quality to be 35 (312).

For JPEG, the platform specifies the image quality to be 70 (332).

For WebP, the platform specifies the following special encoder settings: filter_strength=100, filter_sharpness=7, and method=6 (314).

For JPEG, the platform specifies that the preview image is interlaced, i.e., not progressive (334).

With the parameters as specified, the platform invokes a WebP encoder, or a JPEG encoder, as the case may be, to encode the image in the message (320).

The platform can optionally be configured to generate and cache tiny previews for later use, for example, when messages with images are posted to the platform. In that case, the operation of generating tiny previews, step 210 in the flow of FIG. 2, would be or include obtaining previously generated tiny previews from the cache.

The inventors have found that tiny previews generated in this way provide good image information to the user of the receiving user device and are so small as to put a minimal burden on the bandwidth and data available to the user.

In particular, for the WebP tiny previews, testing a dataset of 1,000 random images, the inventors found that the average size of the previews was 512 bytes; the median size, 486 bytes; and the maximum size, 1,282 bytes; with a standard deviation of 204 bytes.

For the JPEG tiny previews, testing a dataset of 1,000 random images, the inventors found that the average size of the previews was 1,074 bytes; the median size, 1,030 bytes; and the maximum size, 4,411 bytes; with a standard deviation of 411 bytes.

Alternative Modes of Delivery of Tiny Previews

The platform can optionally be configured to generate and send the tiny preview with the message in all cases, so that the client has an image to display immediately. The client can then download a higher quality image asynchronously unless tiny preview was requested.

The platform can optionally or in addition embed a tiny preview as metadata for a full size image so that the tiny preview is loaded and displayed first as the image itself progressively loads.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
    one or more computers and one or more storage devices on which are stored instructions that are operable, when executed by the one or more computers, to cause the one or more computers to perform operations comprising:
    receiving a request for a message stream from client software on a first user device of a plurality of user devices configured to interact with a messaging platform using the client software, wherein each user device has a first decoder configured to decode images encoded as images of a first image type, and wherein some but not all of the user devices have a second decoder configured to decode images encoded as images of a second image type;
    determining, by the platform and for the first user device, to send tiny preview images in place of original images in messages of the message stream to the first user device, wherein determining to send the tiny preview images comprises:
        obtaining location data from the first user device indicating a current geographic location of the first user device at a time the request for the massage stream was sent, and
        determining that the current geographic location is in a location to which the platform has determined to send tiny preview images in a place of images of messages of message streams sent to devices at the location;
    in response to determining to send tiny preview images in place of the original images, generating the tiny preview images, the generating comprising:
        determining whether the first user device has the second decoder,
        in response to determining that the first user device has the second decoder, encoding, by the platform, the original images in the message stream using a second encoder configured with one or more second parameter values selected to generate encoded images of the second image type that have a smaller average image size than an average image size of the original images had the original images been encoded using a first encoder configured to encode images of the first image type, wherein the second encoder configured with the second parameter values generates images that average about 500-1000 bytes in size, and in response to determining that the first user device does not have the second decoder, encoding, by the platform, the original images in the message stream using the first encoder configured with one or more first parameter values selected to generate encoded images of the first image type, wherein the first encoder configured with the first parameter values generates images that average about 500-1000 bytes in size; and sending, in response to the request and by the platform, the message stream comprising the encoded images as the tiny preview images in place of the original images.

2. The system of claim 1, wherein sending the message stream comprising the encoded images as the tiny preview images comprises:

sending metadata comprising a respective encoded image for each original image in each message of the message stream; and initiating sending data comprising the original images in the messages of the message stream asynchronously from sending the metadata.

3. The system of claim 1, wherein the operations further comprise:

maintaining a cache of encoded images of a plurality of image types, including the first image type and the second image type;

receiving a second request for a second message stream from a second user device; and determining, by the platform and for the second user device, to send tiny preview images in place of original images in messages of the second message stream to the second user device, and in response, generating the tiny preview images in place of the original images in messages of the second message stream, comprising:

for each original image in the second message stream, determining whether the cache comprises a respective encoded image for the original image of an image type for which the second user device has a decoder matching the image type, and if so, replacing the original image in the second message stream with the respective encoded image.

4. The system of claim 1, wherein the first image type of the first encoder and the first decoder is a JPEG image type, and wherein the second image type of the second encoder and the second decoder is a WebP image type.

5. The system of claim 4, wherein the first encoder configured with the one or more first parameter values encodes images with an average size of about 1,000 bytes, and wherein the second encoder configured with the one or more second parameter values encodes images with an average size of about 500 bytes.

6. A system comprising:

one or more computers and one or more storage devices on which are stored instructions that are operable, when executed by the one or more computers, to cause the one or more computers to perform operations comprising:

receiving a request for a message stream from client software on a first user device of a plurality of user devices configured to interact with a messaging platform using the client software, wherein each user device has a first decoder configured to decode images encoded as images of a first image type, and wherein some but not all of the user devices have a second decoder configured to decode images encoded as images of a second image type;

determining, by the platform and for the first user device, to send tiny preview images in place of original images in messages of the message stream to the first user device, wherein determining to send the tiny preview images comprises:

obtaining device data from the first user device indicating that a device type of the first user device is a first deice type, and determining that the first device type is a device type to which the platform has determined to send tiny preview images in place of original images in messages of message streams;

in response to determining to send tiny preview images in place of the original images, generating the tiny preview images, the generating comprising:

determining whether the first user device has the second decoder, in response to determining that the first user device has the second decoder, encoding, by the platform, the original images in the message stream using a second encoder configured with one or more second parameter values selected to generate encoded images of the second image type that have a smaller average image size than an average image size of the original images had the original images been encoded using a first encoder configured to encode images of the first image type, wherein the second encoder configured with the second parameter values generates images that average about 500-1000 bytes in size, and in response to determining that the first user device does not have the second decoder, encoding, by the platform, the original images in the message stream using the first encoder configured with one or more first parameter values selected to generate encoded images of the first image type, wherein the first encoder configured with the first parameter values generates images that average about 500-1000 bytes in size; and sending, in response to the request and by the platform, the message stream comprising the encoded images as the tiny preview images in place of the original images.

7. The system of claim 6, wherein sending the message stream comprising the encoded images as the tiny preview images comprises:

sending metadata comprising a respective encoded image for each original image in each message of the message stream; and initiating sending data comprising the original images in the messages of the message stream asynchronously from sending the metadata.

8. The system of claim 6, wherein the operations further comprise:

maintaining a cache of encoded images of a plurality of image types, including the first image type and the second image type;

receiving a second request for a second message stream from a second user device; and determining, by the platform and for the second user device, to send tiny preview images in place of original images in messages of the second message stream to the second user device, and in response, generating the tiny preview images in place of the original images in messages of the second message stream, comprising:

for each original image in the second message stream, determining whether the cache comprises a respective encoded image for the original image of an image type for which the second user device has a decoder matching the image type, and if so, replacing the original image in the second message stream with the respective encoded image.

9. The system of claim 6,
wherein the first image type of the first encoder and the first decoder is a JPEG image type, and
wherein the second image type of the second encoder and the second decoder is a WebP image type.

10. The system of claim 9, wherein the first encoder configured with the one or more first parameter values encodes images with an average size of about 1,000 bytes, and wherein the second encoder configured with the one or more second parameter values encodes images with an average size of about 500 bytes.

11. A system comprising:
one or more computers and one or more storage deices on which are stored instructions tat are operable, when executed by one or more computers, to cause the one or more computers to perform operations comprising:
receiving a request for a message stream from client software on a first user device of a plurality of user devices configured to interact with a messaging platform using the client software, wherein each user device has a first decoder configured to decode images encoded as images of a first image type, and wherein some but not all of the user devices have a second decoder configured to decode images encoded as images of a second image type;
determining, by the platform and for the first user device, to send tiny preview images in place of original images in messages of the message stream to the first user device, wherein determining to send the tiny preview images comprises:
receiving a request from the first user device requesting that tiny preview images be sent in place of original images in messages of the message stream, wherein the system comprises the first user device and the first user device is configured to send the request requesting that the tiny preview images be sent in response to a determination by the client software of the first user device that one or both of (i) a current download bit rate or (ii) a remaining amount of data allotted to the first user device do not meet respective predetermined thresholds;
in response to determining to send tiny preview images in place of the original images, generating the tiny preview images, the generating comprising:
determining whether the first user device has the second decoder,
in response to determining that the first user device has the second decoder, encoding, by the platform, the original images in the message stream using a second encoder configured with one or more second parameter values selected to generate encoded images of the second image type that have a smaller average image size than an average image size of the original images had the original images been encoded using a first encoder configured to encode images of the first image type, wherein the second encoder configured with the second parameter values generates images that average about 500-1000 bytes in size, and in response to determining that the first user device does not have the second decoder, encoding, by the platform, the original images in the message stream using the first encoder configured with one or more first parameter values selected to generate encoded images of the first image type, wherein the first encoder configured with the first parameter values generates images that average about 500-1000 bytes in size; and sending, in response to the request and by the platform, the message stream comprising the encoded images as the tiny preview images in place of the original images.

12. The system of claim 11, wherein sending the message stream comprising the encoded images as the tiny preview images comprises:
sending metadata comprising a respective encoded image for each original image in each message of the message stream; and
initiating sending data comprising the original images in the messages of the message stream asynchronously from sending the metadata.

13. The system of claim 11, wherein the operations further comprise:
maintaining a cache of encoded images of a plurality of image types, including the first image type and the second image type;
receiving a second request for a second message stream from a second user device; and
determining, by the platform and for the second user device, to send tiny preview images in place of original images in messages of the second message stream to the second user device, and in response, generating the tiny preview images in place of the original images in messages of the second message stream, comprising:
for each original image in the second message stream, determining whether the cache comprises a respective encoded image for the original image of an image type for which the second user device has a decoder matching the image type, and if so, replacing the original image in the second message stream with the respective encoded image.

14. The system of claim 11,
wherein the first image type of the first encoder and the first decoder is a JPEG image type, and
wherein the second image type of the second encoder and the second decoder is a WebP image type.

15. The system of claim 14, wherein the first encoder configured with the one or more first parameter values encodes images with an average size of about 1,000 bytes, and wherein the second encoder configured with the one or more second parameter values encodes images with an average size of about 500 bytes.

16. A system comprising:
one or more computers and one or more storage devices on which are stored instructions that are operable, when executed by the one or more computers, to cause the one or more computers to perform operations comprising:
receiving a request for a message stream from client software on a first user device of a plurality of user devices configured to interact with a messaging platform using the client software, wherein each user device has a first decoder configured to decode images encoded as images of a first image type, and wherein some but not all of the user devices have a second decoder configured to decode images encoded as images of a second image type;

determining, by the platform and for the first user device, to send tiny preview images in place of original images in messages of the message stream to the first user device;

in response to determining to send tiny preview images in place of the original images, generating the tiny preview images, the generating comprising:

determining whether the first user device has the second decoder, in response to determining that the first user device has the second decoder, encoding, by the platform, the original images in the message stream using a second encoder configured with one or more second parameter values selected to generate encoded images of the second image type that have a smaller average image size than an average image size of the original images had the original images been encoded using a first encoder configured to encode images of the first image type, wherein the second encoder configured with the second parameter values generates images that average about 500-1000 bytes in size, and in response to determining that the first user device does not have the second decoder, encoding, by the platform, the original images in the message stream using the first encoder configured with one or more first parameter values selected to generate encoded images of the first image type, wherein the first encoder configured with the first parameter values generates images that average about 500-1000 bytes in size;

sending, in response to the request and by the platform, the message stream comprising the encoded images as the tiny preview images in place of the original images;

maintaining a cache of encoded images of a plurality of image types, including the first image type and the second image type;

receiving a second request for a second message stream from a second user device; and determining, by the platform and for the second user device, to send tiny preview images in place of original images in messages of the second message stream to the second user device, and in response, generating the tiny preview images in place of the original images in messages of the second message stream, comprising:

for each original image in the second message stream, determining whether the cache comprises a respective encoded image for the original image of an image type for which the second user device has a decoder matching the image type, and if so, replacing the original image in the second message stream with the respective encoded image.

17. The system of claim 16, wherein determining to send the tiny preview images comprises:

obtaining location data from the first user device indicating a current geographic location of the first user device at a time the request for the message stream was sent; and determining that the current geographic location is in a location to which the platform has determined to send tiny preview images in place of images of messages of message streams sent to devices at the location.

18. The system of claim 16, wherein determining to send the tiny preview images comprises:

obtaining device data from the first user device indicating that a device type of the first user device is a first device type; and determining that the first device type is a device type to which the platform has determined to send tiny preview images in place of original images in messages of message streams.

19. The system of claim 16, wherein determining to send the tiny preview images comprises:

receiving a request from the first user device requesting that tiny preview images be sent in place of original images in messages of the message stream.

20. The system of claim 19, comprising the first user device, wherein the first user device is further configured to send the request requesting that the tiny preview images be sent in response to a determination by the client software of the first user device that one or both of (i) a current download bit rate or (ii) a remaining amount of data allotted to the first user device do not meet respective predetermined thresholds.

21. The system of claim 16, wherein sending the message stream comprising the encoded images as the tiny preview images comprises:

sending metadata comprising a respective encoded image for each original image in each message of the message stream; and initiating sending data comprising the original images in the messages of the message stream asynchronously from sending the metadata.

22. The system of claim 16, wherein the operations further comprise:

maintaining a cache of encoded images of a plurality of image types, including the first image type and the second image type;

receiving a second request for a second message stream from a second user device; and determining, by the platform and for the second user device, to send tiny preview images in place of original images in messages of the second message stream to the second user device, and in response, generating the tiny preview images in place of the original images in messages of the second message stream, comprising:

for each original image in the second message stream, determining whether the cache comprises a respective encoded image for the original image of an image type for which the second user device has a decoder matching the image type, and if so, replacing the original image in the second message stream with the respective encoded image.

23. The system of claim 16, wherein the first image type of the first encoder and the first decoder is a JPEG image type, and wherein the second image type of the second encoder and the second decoder is a WebP image type.

24. The system of claim 23, wherein the first encoder configured with the one or more first parameter values encodes images with an average size of about 1,000 bytes, and wherein the second encoder configured with the one or more second parameter values encodes images with an average size of about 500 bytes.

* * * * *